United States Patent
Duricic et al.

(10) Patent No.: US 11,682,940 B2
(45) Date of Patent: Jun. 20, 2023

(54) ROTOR

(71) Applicant: Bayerische Motoren Werke Aktiengesellschaft, Munich (DE)

(72) Inventors: Dragoljub Duricic, Munich (DE); Thorsten Rienecker, Munich (DE); Philipp Schlag, Munich (DE); Daniel Winkle, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 376 days.

(21) Appl. No.: 16/784,473

(22) Filed: Feb. 7, 2020

(65) Prior Publication Data

US 2020/0177044 A1    Jun. 4, 2020

Related U.S. Application Data

(63) Continuation of application No. PCT/EP2018/069574, filed on Jul. 19, 2018.

(30) Foreign Application Priority Data

Aug. 10, 2017  (DE) .................... 10 2017 213 904.8

(51) Int. Cl.
| | |
|---|---|
| *H02K 3/34* | (2006.01) |
| *B29C 45/16* | (2006.01) |
| *H02K 3/52* | (2006.01) |
| *H02K 15/02* | (2006.01) |
| *B29K 101/10* | (2006.01) |
| *H02K 15/10* | (2006.01) |

(52) U.S. Cl.
CPC .............. *H02K 3/345* (2013.01); *B29C 45/16* (2013.01); *H02K 3/522* (2013.01); *H02K 15/022* (2013.01); *B29K 2101/10* (2013.01); *H02K 15/10* (2013.01)

(58) Field of Classification Search
CPC ...... H02K 3/345; H02K 3/522; H02K 15/022; H02K 15/10; B29C 45/16; B29K 2191/19; B29K 2101/10
USPC .................................................. 310/216.053
See application file for complete search history.

(56) References Cited

U.S. PATENT DOCUMENTS

| | | |
|---|---|---|
| 4,490,638 A | 12/1984 | Lind |
| 5,010,266 A | 4/1991 | Uchida |
| 2001/0006316 A1 | 7/2001 | Berger |
| 2005/0035680 A1 | 2/2005 | Murakami et al. |
| 2011/0020154 A1 | 1/2011 | Matsuda et al. |

(Continued)

FOREIGN PATENT DOCUMENTS

| | | |
|---|---|---|
| CN | 102428625 A | 4/2012 |
| CN | 103178632 A | 6/2013 |

(Continued)

OTHER PUBLICATIONS

English translation of Chinese-language Office Action issued in Chinese Application No. 201880036749.8 dated Dec. 11, 2020 (10 pages).

(Continued)

*Primary Examiner* — Jianchun Qin
(74) *Attorney, Agent, or Firm* — Crowell & Moring LLP

(57) ABSTRACT

A rotor, in particular of an electrical machine, has a base body and at least one metallic end plate which is mounted on the base body. The base body and the at least one end plate have a continuous layer which is injection molded.

11 Claims, 3 Drawing Sheets

(56) References Cited

U.S. PATENT DOCUMENTS

| | | |
|---|---|---|
| 2013/0154437 A1 | 6/2013 | Kaiser et al. |
| 2015/0061445 A1 | 3/2015 | Ishimatsu et al. |
| 2015/0326083 A1 | 11/2015 | Song |
| 2016/0164357 A1 | 7/2016 | Yang et al. |
| 2018/0316252 A1 | 11/2018 | Mondin et al. |

FOREIGN PATENT DOCUMENTS

| | | | |
|---|---|---|---|
| CN | 203312939 U | | 11/2013 |
| CN | 104871414 A | | 8/2015 |
| CN | 105680597 A | * | 6/2016 |
| CN | 105846566 A | * | 8/2016 |
| CN | 106849526 A | | 6/2017 |
| DE | 2 238 755 A1 | | 2/1974 |
| DE | 38 81 865 T2 | | 11/1993 |
| DE | 199 64 061 A1 | | 7/2001 |
| DE | 10 2012 224 375 A1 | | 7/2014 |
| DE | 102015213593 A1 | * | 6/2016 ............... H02K 1/32 |
| DE | 10 2015 219 685 A1 | | 4/2017 |
| DE | 102015219685 B1 | * | 4/2017 |
| JP | 2013-220004 A | | 10/2013 |

OTHER PUBLICATIONS

Chinese-language Office Action issued in Chinese Application No. 201880036749.8 dated Jun. 10, 2021 with English translation (13 pages).

International Search Report (PCT/ISA/210) issued in PCT Application No. PCT/EP2018/069574 dated Sep. 28, 2018 with English translation (four (4) pages).

German-language Written Opinion (PCT/ISA/237) issued in PCT Application No. PCT/EP2018/069574 dated Sep. 28, 2018 (six (6) pages).

German-language Search Report issued in counterpart German Application No. 102017213904.8 dated Jul. 9, 2018 with partial English translation (13 pages).

English translation of Chinese Office Action issued in Chinese Application No. 201880036749.8 dated Apr. 6, 2022 (six (6) pages).

* cited by examiner

ROTOR

CROSS REFERENCE TO RELATED APPLICATIONS

This application is a continuation of PCT International Application No. PCT/EP2018/069574, filed Jul. 19, 2018, which claims priority under 35 U.S.C. § 119 from German Patent Application No. 10 2017 213 904.8, filed Aug. 10, 2017, the entire disclosures of which are herein expressly incorporated by reference.

BACKGROUND AND SUMMARY OF THE INVENTION

The present invention relates to a rotor, in particular a rotor of an electric machine, to an electric machine and to a method for producing an electric machine.

It is known from the prior art to insulate laminated cores of rotors, for example with aramid paper or other sheet-like insulating materials. Furthermore, it is also known to overmold the laminated core as a whole and/or the slots with plastic, wherein for example DE 2 238 755 teaches that the end disks of the laminated core are to be concomitantly produced at the same time as the injection molding, casting or pressing. A disadvantage of this is that for mass production, it is basically not suitable to insulate the laminated cores with aramid paper, for example. Furthermore, the abovementioned end disks of plastic already are not suitable for strength reasons, in particular for high-speed rotors.

It is therefore an object of the present invention to provide a rotor, an electric machine and a method which overcome the abovementioned disadvantages and at the same time can be produced or realized inexpensively.

According to the invention, a rotor, in particular a rotor of an electric machine, such as an electric motor, comprises a main body and at least one metallic end disk, which is arranged at the end side on the main body, wherein the main body and the at least one end disk are provided with a coherent layer, and wherein the layer is injection molded. The main body is preferably a laminated core. The end disks, which are preferably formed as so-called star or face disks, are expediently arranged at a face side on the laminated core or the main body. The rotor is preferably a high-speed rotor for a current-excited synchronous machine. Here, a metallic star disk or face disk is advantageously installed at each of the face sides of the rotors for strength reasons. The end disk, or star or face disk, is advantageously used to deflect the wire windings and to balance the rotors. The end disks preferably have retaining sections which are designed, inter alia, to support the subsequently arranged conductor elements, wires and/or windings, in particular in a radial direction. These retaining sections advantageously extend in an axial direction, or along an axis of rotation of the rotor, and form a type of "roof", or a multiplicity of "roofs", which support the wires/windings in a radial direction.

An ability to withstand very high speeds, with optimal insulation of the wire windings at the same time, can advantageously be achieved with the proposed rotor/motor, in particular by means of the preferably continuous and fully areally injection-molded layer, which acts in particular as electrical insulation or as an insulation layer and here closes, or spans and/or covers, the contact region or the joining point between the laminated core and the end disk arranged thereon. The layer is advantageously formed at those locations against which the wire and/or conductor elements subsequently bear, wherein the layer is advantageously formed to optimally guide and support the wire and/or conductor elements.

According to one embodiment, the rotor, comprising the end disks, is correspondingly fully areally overmolded, wherein only the circumferential surface of the laminated core and those regions of the end disks that cannot come into contact with a wire or conductor element are excluded.

According to one preferred embodiment, the at least one end disk is composed of a metal, such as aluminum, or of an aluminum alloy. The material is distinguished in particular by its low density, whereby a very lightweight rotor can be realized. Additionally, the strength of the entire arrangement and/or of the rotor can be increased by the layer. The layer thus additionally supports the entire arrangement. The layer therefore preferably not only acts as insulation, but also contributes to an increase in the strength of the entire rotor. Alternatively, the end disks may also be manufactured from other high-strength materials, such as for example suitable composite materials.

According to one preferred embodiment, the layer is composed of plastic, in particular of a thermoplastic or thermoset. The abovementioned materials may possibly be provided with further insulation-enhancing and/or strength-increasing materials, for example with corresponding particles or fibers, etc.

The layer is expediently injection molded, wherein the laminated core, comprising the end disks arranged at a respective face side, is inserted into a correspondingly configured injection molding tool. Here, according to one embodiment, the casting takes place in a direction along an axis of rotation of the rotor, in other words axially. Alternatively, the injecting may also take place radially. It is crucial that the entire composition, comprising the laminated core and the end disks (possibly also only one), is overmolded as a whole.

The at least one end disk and/or the end disks particularly preferably is/are arranged directly on the main body or on the laminated core. In the prior art, laminated cores having integrally molded slot base insulation but also requiring a thin plastics insulation at the face sides owing to the creepage distance issue are indeed known. When arranging the end disks, however, this leads to an increased structural space requirement, which may amount to a few millimeters. Advantageously, additional structural space may be omitted and/or the existing structural space may be better used electrically by means of the direct arrangement of the end disks on the respective last element of the laminated core. According to one embodiment, the end disks and the laminated core are pinned to one another.

According to one embodiment, the layer forms grooves and/or depressions which are designed for the arrangement of conductor elements/wire elements and which accordingly run axially/parallel to an axis of rotation of the rotor. The grooves and/or depressions are thus advantageously oriented along a longitudinal direction of the conductor element(s), in particular of the wire elements, and form a contour which facilitates the arrangement of the conductor elements and in particular prevents a slippage of a first layer of the wire elements.

According to one embodiment, the layer forms at least one arranging section for a slot-closing wedge. Such an arranging section can for example be formed in the manner of a guide rail, in which the slot wedge and/or the slot-closing wedge engages in positively locking fashion.

According to one embodiment, the layer has at least one guide element, in particular a lug and/or notches, for guiding a conductor element. The lug may in particular be formed to fix and/or to lock a start of a conductor element. The notches are advantageously locating aids for the routing of the conductor element(s).

According to one embodiment, sealing surfaces may also be realized by the layer. Here, for example, the sealing surfaces are in particular arranged at the face sides and seal off against the injection molding tool during the subsequent overmolding of the rotor after it has been enwound.

According to one embodiment, the layer has at least one electric component, which is cast in. The components may be for example integrated connecting elements as insert parts for making contact.

According to one embodiment, the rotor is of multi-part, in particular two-part form, wherein the layer forms locating and/or retaining means in a connecting region of two rotor parts. The connecting region expediently extends perpendicularly to the axis of rotation, so to speak opposite the end disks, and is preferably fully areally or else at least partially provided with the layer. The multi-part, in particular two-part construction of the rotor, wherein according to one embodiment the two rotor parts are of equal length, has the advantage that the required injection depth during the injection process can be reduced. The wall thickness of the insulation may generally be formed so as to be thinner the smaller the injection depth. A very thin insulation layer, which enables a very high fill factor, may thus be created by means of the two-part construction. A very rapid and precise arrangement of the two rotor parts in relation to one another is simultaneously made possible by means of the locating and/or retaining means arranged and/or formed at a face side. The abovementioned retaining means are to be understood to mean in particular that a type of plugging-together or clipping of the two rotor parts by way of the correspondingly formed layer is possible, for example by way of a rotational movement.

The invention also relates to an electric machine, comprising a rotor according to the invention. The electric machine is preferably a current-excited synchronous machine.

The invention is also directed at a method for producing an electric machine, in particular a rotor of an electric machine, comprising the steps of:
  providing a rotor, which extends along an axis of rotation;
  arranging a metallic end disk at a face side at at least one end of the rotor, preferably at both ends of the rotor;
  overmolding the rotor and the at least one end disk with a material to produce a layer connecting the rotor and the at least one end disk.

The rotor, which is formed from a laminated core, preferably has an end disk, or a star or face disk, at each of the two ends. These disks are advantageously arranged directly on the rotor laminated core, whereby the available structural space can be used as effectively as possible. The overmolding advantageously takes place by injection molding. It is furthermore advantageous for the overmolding to take place in such a way that the rotor, as well as the end disks, are not overmolded on the circumference. In particular, those regions or locations which are subsequently enwound with conductor elements, that is to say for example wires, are overmolded. The layer is expediently an insulation layer, such as a slot base insulation, which, however, is advantageously of encircling and/or closed form, and for example encloses a rotor tooth or the rotor teeth, in particular does not end at the end of a laminated core but is deflected by the end disks and is thus intrinsically closed. The rotor, preferably comprising two face disks arranged at the end sides, preferably has a closed insulation layer and/or slot base insulation. Back-winding of such an insulation is not possible. Thus, the insulation quality can be considerably improved with respect to the prior art. In particular, the method is also very rapid and makes possible extremely short cycle times and is thus also suitable for series production.

The advantages and features mentioned in conjunction with the rotor also apply analogously and correspondingly to the electric machine and the method, and vice versa.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
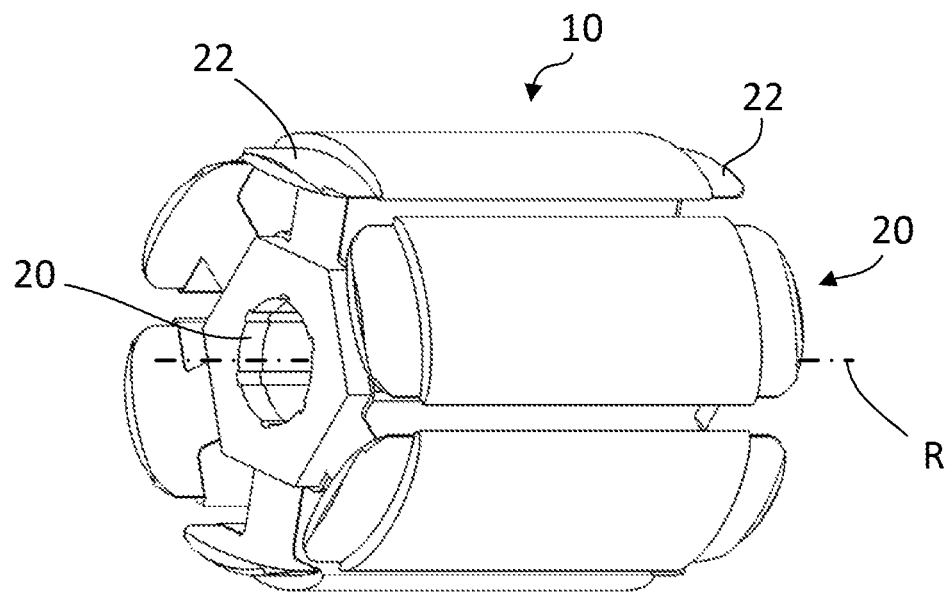
FIG. 1 shows two perspective views of a rotor before and after the injection molding.
Figure 1:
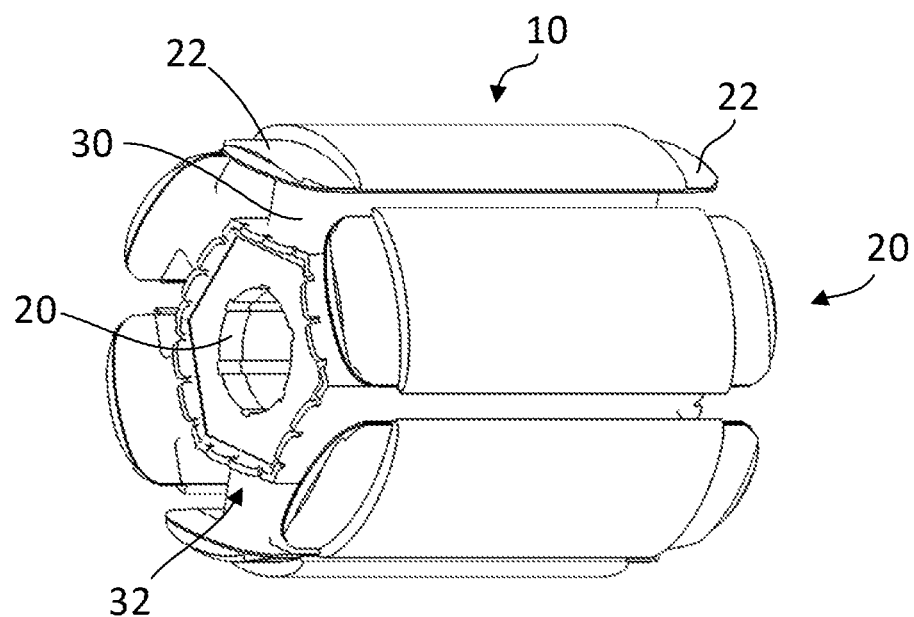

FIG. 1 shows two perspective views of a rotor before (top half of the image) and after the injection molding (bottom half of the image). The reference designation 10 in particular denotes a main body or a laminated core of the rotor, which extends along an axis of rotation R, wherein an end disk, or a star or face disk, 20 is arranged at each face side thereof. These disks 20 have axially extending retaining sections 22 which in particular serve for the radial support of a winding (not illustrated here). According to a preferred embodiment, the end disks 20 are composed of metal, in particular of aluminum. It can be seen in the bottom half of the image that a layer 30 is injected fully areally over the end disks 20 and/or the laminated core 10. Only the outer surfaces or circumferential surfaces of the laminated core are not provided with a layer. The layer is ultimately provided at those locations against which the winding, the conductor elements and/or in particular the wires subsequently bear or bears. The layer 30 is in particular an insulation layer, which, however, simultaneously also contributes to an increase in the strength of the entire rotor. Guide elements in the form of notches are shown with the reference designation 32, which act or serve as locating aids when routing the conductor elements, for example. According to one embodiment, sealing surfaces may also be realized by the layer. Here, for example, the sealing surfaces are in particular arranged at the face sides and seal off against the injection molding tool during the subsequent overmolding of the rotor after it has been enwound.

Figure 2:
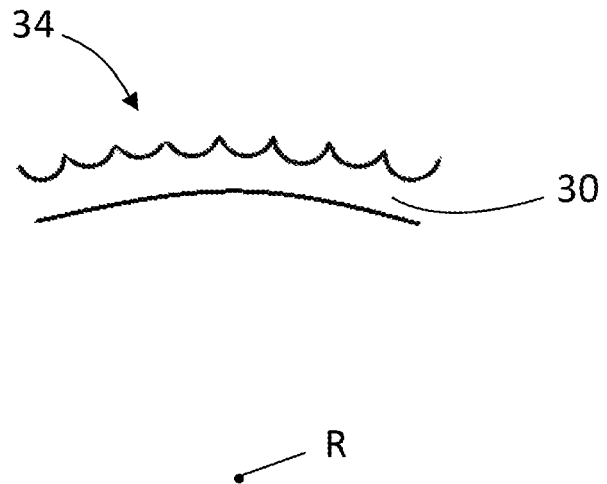
FIG. 2 is a partial axial view illustrating grooves in the layer configured for arranging conductor elements.

FIG. 2 shows in an axial view the layer 30 forming grooves and/or depressions 34 designed for the arrangement of conductor elements/wire elements. The grooves and/or depressions run axially/parallel to an axis of rotation R of the rotor. The grooves and/or depressions advantageously are oriented along a longitudinal direction of the conductor elements, in particular of the wire elements, and form a contour which facilitates the arrangement and, in particular, prevents a slippage of a first layer of the wire elements.

Figure 3:
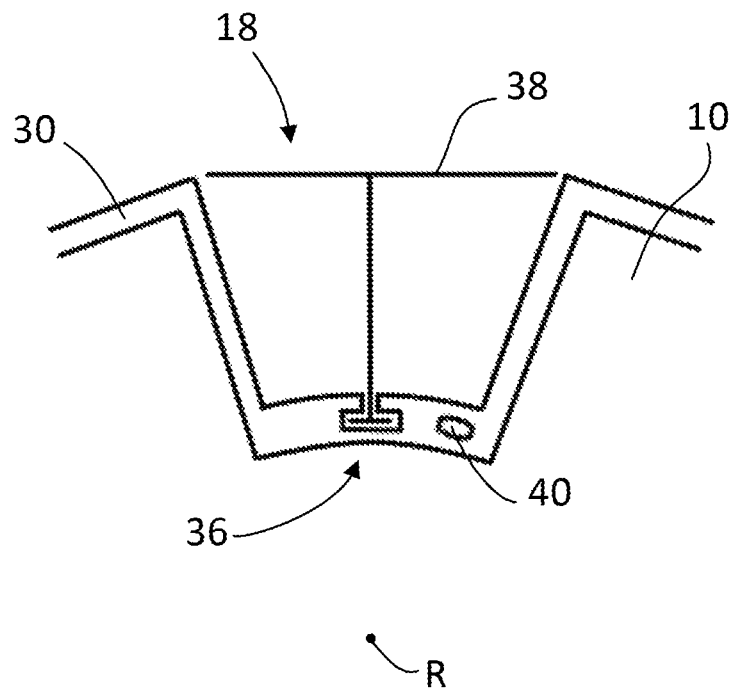
FIG. 3 is a partial axial view of the layer forming an arranging section for a slot-closing wedge.

FIG. 3 is an axial view wherein the layer 30 forms at least one arranging section 36 for a slot-closing wedge 38. The arranging section 36 can, for example, be formed in the manner of a guide rail, in which the slot-closing wedge engages in a positively locking fashion. As shown in FIG. 3, the layer 30 may have at least one electric component 40 which is cast-in.

Figure 4:
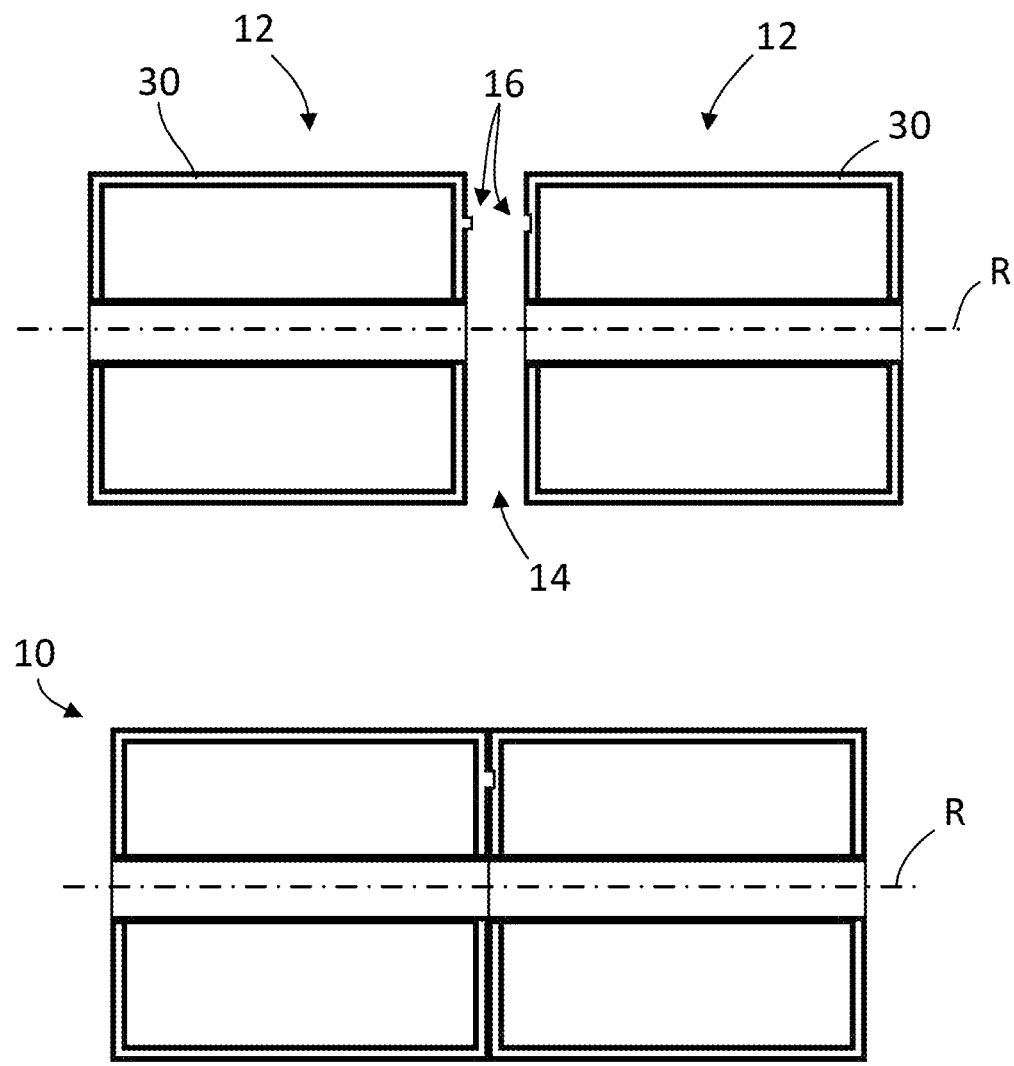
FIG. 4 is an axial cross-section view of a rotor in multi-part form with the layer forming a locating and/or retaining device in a connecting region of two rotor parts.

As shown in FIG. 4, the rotor 12 may be of multi-part, in particular two-part, form. The layer 30 forms locating and/or retaining elements 16 in a connecting region 14 of the two rotor parts. The connecting region 16 expediently extends perpendicularly to the axis of rotation, and is preferably fully areally or else at least partially provided with the layer 30. In the top view of FIG. 4, the two-part rotor is shown apart from one another whereas in the lower part the two-part rotor is shown plugged-together.

LIST OF REFERENCE DESIGNATIONS

10 Main body, laminated core
12 Rotor part
14 Connecting region
16 Locating and/or retaining means
18 Slot
20 End disk, star or face disk
22 Retaining section
30 Layer
32 Guide element
34 Groove
36 Arranging section
38 Slot-closing wedge
40 Electric component The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A rotor of an electric machine, comprising:
   a main body; and
   at least one metallic end disk, which is arranged at an end side on the main body, wherein
   the main body and the at least one end disk are provided with a continuous layer,
   the continuous layer is injection molded,
   the continuous layer is composed of plastic,
   the at least one end disk is composed of aluminum,
   the at least one end disk is arranged directly on the main body,
   the at least one end disk comprises retaining sections that extend along an axis of rotation of the rotor and are configured for radial support of at least one conductor element,
   the rotor is of multi-part form, and
   the continuous layer forms a locating and/or retaining device in a connecting region of two rotor parts within the main body, such that a first portion of the continuous layer protrudes from a first rotor part of the two rotor parts and interlocks with a second portion of the continuous layer formed in a second rotor part of the two rotor parts.

2. The rotor according to claim 1, wherein the plastic is a thermoplastic.

3. The rotor according to claim 1, wherein the plastic is a thermoset.

4. The rotor according to claim 1, wherein the continuous layer is composed of plastic.

5. The rotor according to claim 1, wherein the continuous layer forms grooves configured for arranging conductor elements.

6. The rotor according to claim 1, wherein the continuous layer forms at least one arranging section for a slot-closing wedge.

7. The rotor according to claim 1, wherein the continuous layer has at least one guide element for guiding a conductor element.

8. The rotor according to claim 1, wherein at least one electric component is cast into the continuous layer.

9. The rotor according to claim 1, wherein the rotor is of two-part form.

10. An electric machine, comprising a rotor according to claim 1.

11. A method for producing an electric machine, comprising:
   providing a rotor having a main body, which extends along an axis of rotation;
   arranging a metallic end disk at a face side at at least one end of the main body; and
   overmolding the main body and the at least one end disk with a material to produce a continuous layer connecting the main body and the at least one end disk, wherein:
   the continuous layer is injection molded,
   the continuous layer is composed of plastic,
   the at least one end disk is composed of aluminum,
   the at least one end disk is arranged directly on the main body,
   the at least one end disk comprises retaining sections that extend along an axis of rotation of the rotor and are configured for radial support of at least one conductor element,
   the rotor is of multi-part form, and
   the continuous layer forms a locating and/or retaining device in a connecting region of two rotor parts within the main body, such that a first portion of the continuous layer protrudes from a first rotor part of the two rotor parts and interlocks with a second portion of the continuous layer formed in a second rotor part of the two rotor parts.

* * * * *